(12) United States Patent
Nishizaki

(10) Patent No.: US 11,290,347 B2
(45) Date of Patent: Mar. 29, 2022

(54) COMPUTER-READABLE MEDIUM AND SYSTEM FOR MANAGING TERMINAL DEVICE NOT DIRECTLY COMMUNICABLE WITH TERMINAL MANAGEMENT DEVICE

(71) Applicant: BROTHER KOGYO KABUSHIKI KAISHA, Nagoya (JP)

(72) Inventor: Takashi Nishizaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/036,141

(22) Filed: Sep. 29, 2020

(65) Prior Publication Data

US 2021/0099358 A1  Apr. 1, 2021

(30) Foreign Application Priority Data

Sep. 30, 2019  (JP) ................. 2019-179488

(51) Int. Cl.
*G06F 15/173*  (2006.01)
*H04L 41/00*  (2022.01)
(Continued)

(52) U.S. Cl.
CPC ............... *H04L 41/20* (2013.01); *G06F 8/61* (2013.01); *G06F 8/65* (2013.01); *H04L 41/082* (2013.01); *H04L 67/2804* (2013.01)

(58) Field of Classification Search
CPC ... H04L 41/20; H04L 41/082; H04L 67/2804; H04L 41/044; G06F 8/65; G06F 8/61
See application file for complete search history.

(56) References Cited

U.S. PATENT DOCUMENTS

2007/0239859 A1* 10/2007 Wilkinson .............. H04L 63/08
709/220
2012/0096365 A1*  4/2012 Wilkinson .............. G06F 9/468
715/740

(Continued)

FOREIGN PATENT DOCUMENTS

JP    2017-536598 A   12/2017
WO   WO 2016/048417 A1   3/2016

*Primary Examiner* — John B Walsh
(74) *Attorney, Agent, or Firm* — Scully, Scott, Murphy & Presser, PC

(57) ABSTRACT

A non-transitory computer-readable medium stores computer-readable terminal management instructions configured to, when executed by a first processor of a first computer, cause the first computer to function as a terminal management device configured to communicate with a terminal device via a relay device, obtain terminal management device information regarding the terminal management device, and generate an installation package containing the terminal management device information and an installer, the installer being configured to, when executed by a second processor of a second computer, cause the second computer to install a relay processing program on the second computer to function as the relay device, and change communication settings for the second computer based on the terminal management device information contained in the installation package, thereby enabling the second computer functioning as the relay device to communicate with the terminal management device.

10 Claims, 8 Drawing Sheets

(51) Int. Cl.
*H04L 41/082* (2022.01)
*H04L 67/561* (2022.01)
*G06F 8/65* (2018.01)
*G06F 8/61* (2018.01)

(56) References Cited

U.S. PATENT DOCUMENTS

2014/0240739 A1* 8/2014 Hattori .................. G06F 3/1239
 358/1.13
2017/0245114 A1* 8/2017 Bessho ................. H04W 4/027

* cited by examiner

FIG. 4

| Client | | | | | |
|---|---|---|---|---|---|
| All | | | | | |
| Fukuoka | | | | | |
| Nagoya | | | | | |

| Devices | | | | | |
|---|---|---|---|---|---|
| Client | Status | Model Name | Serial Number | IP Address | Last Update |
| Nagoya | | AA-AAAAAA | ABCDEFG | 192.168.1.23 | 2019/06/08 10:00:58 |

Network

Connection: ○ Working

Stop

Port Number: 52795 (1024-65535)

Basic Authentication for Network Communication:
User ID: abc1def2ghi3jkl4mno5pqr6st u7vwx8yza9bcd0
Password: zy0xw9vu8ts7rq6po5nm4lk3 i2hg1fe0dc9ba8z Device Conductor Agent:
Get Installer

COMPUTER-READABLE MEDIUM AND SYSTEM FOR MANAGING TERMINAL DEVICE NOT DIRECTLY COMMUNICABLE WITH TERMINAL MANAGEMENT DEVICE

CROSS-REFERENCE TO RELATED APPLICATION

This application claims priority under 35 U.S.C. § 119 from Japanese Patent Application No. 2019-179488 filed on Sep. 30, 2019. The entire subject matter of the application is incorporated herein by reference.

BACKGROUND

Technical Field

Aspects of the present disclosure are related to a non-transitory computer-readable medium and a system for managing one or more terminal devices unable to communicate directly with the terminal management device.

Related Art

A technique for managing a plurality of terminal devices by a terminal management device has been known.

SUMMARY

However, the known technology is based on an assumption that the terminal management device is configured to communicate with each of the plurality of terminal devices via a network. Therefore, for instance, when a terminal device exists on a local network such that the terminal management device is not allowed to communicate directly with the terminal device thereon, the terminal management device is unable to collect information from the terminal device at desired timing.

Aspects of the present disclosure are advantageous to provide one or more improved techniques that enable a terminal management device to manage one or more terminal devices even in such an environment that the terminal management device is unable to communicate directly with the one or more terminal device.

According to aspects of the present disclosure, a non-transitory computer-readable medium is provided, which stores computer-readable terminal management instructions configured to, when executed by a first processor of a first computer, cause the first computer to function as a terminal management device configured to communicate with a terminal device via a relay device and obtain terminal information regarding the terminal device via the relay device, obtain terminal management device information regarding the terminal management device, and generate an installation package containing the obtained terminal management device information and an installer. The installer includes computer-readable instructions configured to, when executed by a second processor of a second computer, cause the second computer to install a relay processing program on the second computer, the relay processing program including computer-readable instructions configured to, when executed by the second processor, cause the second computer to function as the relay device, and change communication settings for the second computer based on the terminal management device information contained in the installation package, thereby enabling the second computer functioning as the relay device to communicate with the terminal management device.

According to aspects of the present disclosure, further provided is a non-transitory computer-readable medium storing an installer contained in an installation package generated by a first computer. The installer includes computer-readable instructions configured to, when executed by a second processor of a second computer, cause the second computer to install a relay processing program on the second computer, the relay processing program including computer-readable instructions configured to, when executed by the second processor, cause the second computer to function as a relay device, and change communication settings for the second computer based on terminal management device information contained in the installation package, thereby enabling the second computer functioning as the relay device to communicate with the first computer that is functioning as a terminal management device according to a terminal management processing program. The terminal management processing program includes computer-readable instructions configured to, when executed by a first processor of the first computer, cause the first computer to function as the terminal management device configured to communicate with a terminal device via the relay device and obtain terminal information regarding the terminal device via the relay device, obtain the terminal management device information regarding the terminal management device, and generate the installation package containing the obtained terminal management device information and the installer.

According to aspects of the present disclosure, further provided is a system including a first computer, a second computer, and a terminal device. The first computer includes a first processor, and a memory storing a terminal management processing program. The terminal management processing program includes computer-readable instructions configured to, when executed by the first processor, cause the first computer to function as a terminal management device configured to communicate with the terminal device via a relay device and obtain terminal information regarding the terminal device via the relay device, obtain terminal management device information regarding the terminal management device, and generate an installation package containing the obtained terminal management device information and an installer. The installer includes computer-readable instructions configured to, when executed by a second processor of the second computer, cause the second computer to install a relay processing program on the second computer to function as the relay device, and change communication settings for the second computer based on the terminal management device information contained in the installation package, thereby enabling the second computer functioning as the relay device to communicate with the first computer functioning as the terminal management device.

BRIEF DESCRIPTION OF THE ACCOMPANYING DRAWINGS

FIG. 4 shows an example of an input screen displayed on the terminal management device, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Configuration of Terminal Management System

Figure 1:
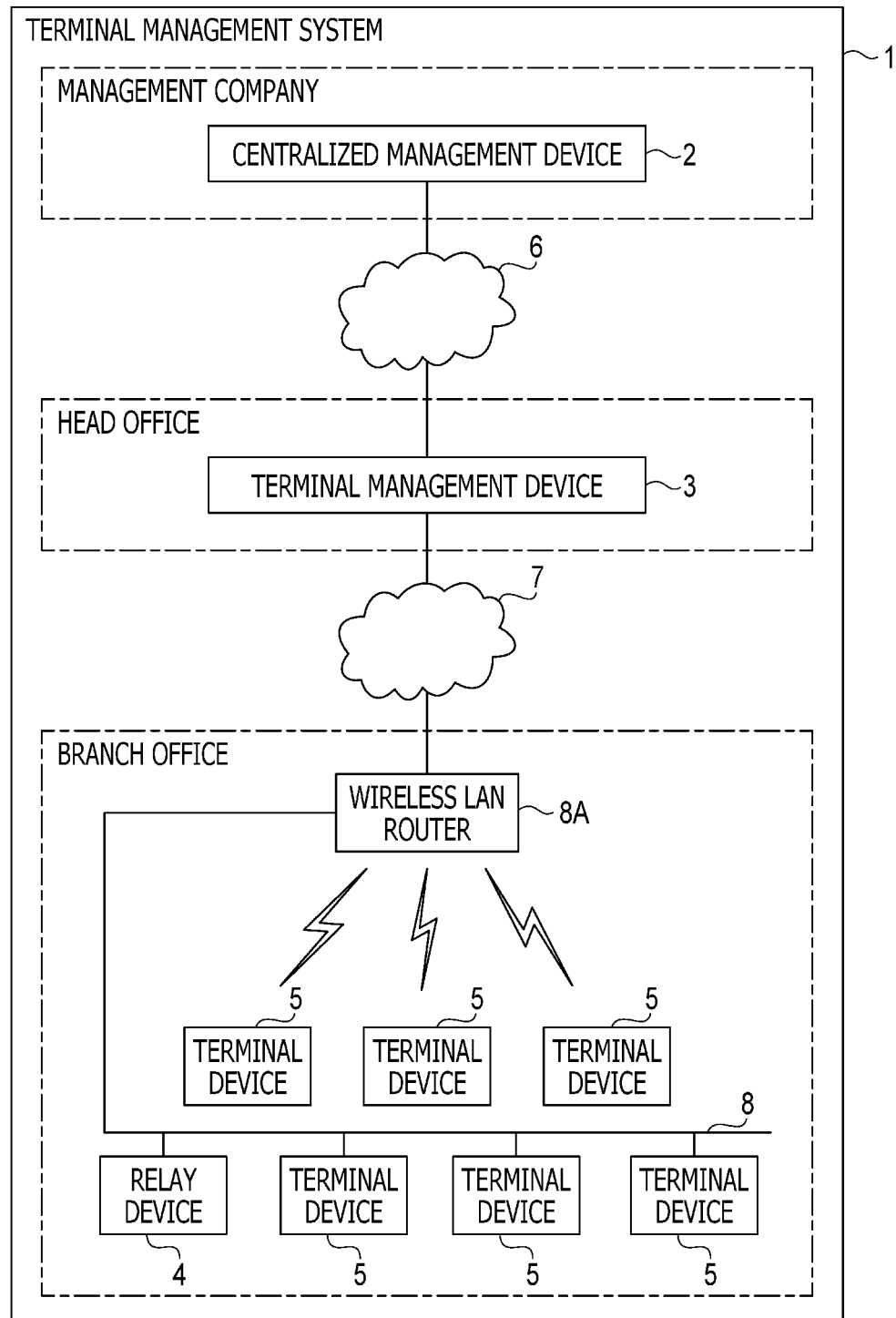
FIG. 1 is a block diagram schematically showing a configuration of a terminal management system in an illustrative embodiment according to one or more aspects of the present disclosure.

As shown in FIG. 1, a terminal management system 1 includes a centralized management device 2, a terminal management device 3, a relay device 4, and terminal devices 5. Further, as shown in FIG. 1, the centralized management device 2 and the terminal management device 3 are configured to communicate with each other via a WAN ("WAN" is an abbreviation for "Wide Area Network") 6. The terminal management device 3 and the relay device 4 are configured to communicate with each other via a WAN 7 and a LAN ("LAN" is an abbreviation for "Local Area Network") 8.

The relay device 4 and the terminal devices 5 are configured to communicate with each other via the LAN 8. The WAN 6 and the WAN 7 may be the same network or may be separate networks. In the illustrative embodiment, both of the WAN 6 and the WAN 7 use the Internet.

The WAN 7 and the LAN 8 are connected with each other via a wireless LAN router 8A. The wireless LAN router 8A is a device having both a router function and a wireless LAN access point function. In addition, the wireless LAN router 8A has a firewall function and is configured to prevent unauthorized access from the side of the WAN 7 to the side of the LAN 8. The wireless LAN router 8A is connected with a LAN cable. Thereby, the LAN 8 is configured to serve as both a wired LAN and a wireless LAN.

The terminal devices 5 may include one or more terminal devices 5 connectable with the wireless LAN and one or more terminal devices 5 connectable with the wired LAN. In the illustrative embodiment, it is assumed that each of the one or more terminal devices 5 connectable with the wireless LAN is a printer (hereinafter, which may be referred to as a "mobile printer") that is used in conjunction with a mobile terminal. In this case, each terminal device 5 connectable with the wireless LAN establishes a communication link with the wireless LAN router 8A when located within a communicable range of the wireless LAN router 8A, thereby being incorporated into the terminal management system 1. Examples of the one or more terminal devices 5 connectable with the wired LAN may include, but are not limited to, printers and MFPs ("MFP" is an abbreviation for "Multi-Function Peripheral") that are incompatible with the wireless LAN.

For instance, in the terminal management system 1 of the illustrative embodiment, the centralized management device 2 may collect information from the terminal devices 5, and may remotely control the terminal devices 5 to perform processes such as test printing, rebooting, and shutting down. Examples of a location where each device included in the terminal management system 1 is installed may include, but are not limited to, a case in which the terminal management device 3 is installed at a head office of Company A, and the relay device 4 and the terminal devices 5 are installed at a branch office of Company A.

In this case, information (hereinafter, which may be referred to as "terminal information") regarding each of the plurality of terminal devices 5 operated at the branch office of Company A is collected by the terminal management device 3 installed at the head office of Company A. The terminal information collected by the terminal management device 3 is collected and managed by the centralized management device 2, for instance, which is operated by a management company different from Company A. However, the centralized management device 2 may be operated by Company A. Thus, it is arbitrary whether or not Company A and the management company are separate companies.

Although the following features are not shown in FIG. 1, there may be one or more terminal management devices 3 other than the aforementioned terminal management device 3. Namely, the terminal management system 1 may include a plurality of terminal management devices 3. In this case, the plurality of terminal management devices 3 may be configured to be managed by the single centralized management device 2. For instance, a terminal management device 3 may be installed in each of Companies B, C, D, . . . different from Company A, and those plurality of terminal management devices 3 may be managed by the single centralized management device 2 installed in the management company.

Further, although the following features are not shown in FIG. 1, there may be one or more relay devices 4 other than the aforementioned relay device 4. Namely, the terminal management system 1 may include a plurality of relay devices 4. In this case, the plurality of relay devices 4 may be configured to be managed by the single terminal management device 3. For instance, when Company A has a plurality of branch offices, a relay device 4 may be installed at each of the branch offices, and those plurality of relay devices 4 may be managed by the single terminal management device 3 installed at the head office.

Figure 2A:
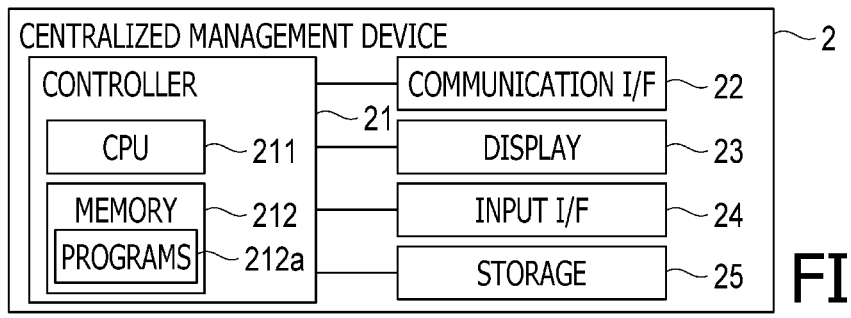
FIG. 2A is a block diagram schematically showing a configuration of a centralized management device included in the terminal management system in the illustrative embodiment according to one or more aspects of the present disclosure.

As shown in FIG. 2A, the centralized management device 2 includes a controller 21, a communication I/F ("I/F" is an abbreviation for "interface") 22, a display 23, an input OF 24, and a storage 25. The controller 21 includes a CPU 211 and a memory 212. The CPU 211 performs various kinds of processing and control in accordance with software such as programs 212a stored in the memory 212, thereby realizing various functions of the centralized management device 2. However, the various functions of the centralized management device 2 are not limited to functions realized by the CPU 211 executing the software such as the programs 212a. Some or all of the various functions of the centralized management device 2 may be realized by one or more hardware elements.

The memory 212 includes one or more semiconductor memories (e.g., a ROM, a RAM, an NVRAM, and a flash memory) that are non-transitory substantive storage media. The memory 212 stores the software (e.g., the programs 212a) and data. The communication I/F 22 includes a network interface controller configured to connect with the WAN 6 and perform communication via the WAN 6. The display 23 is a display device (e.g., a liquid crystal display or an organic EL display) and is configured to display various images. The input I/F 24 includes an input device configured to receive various input operations, and an input controller configured to process inputs from the input device. The storage 25 includes one or more auxiliary storage devices such as an HDD ("HDD" is an abbreviation for "Hard Disk Drive") and an SSD ("SSD" is an abbreviation for "Solid State Drive").

Figure 2B:
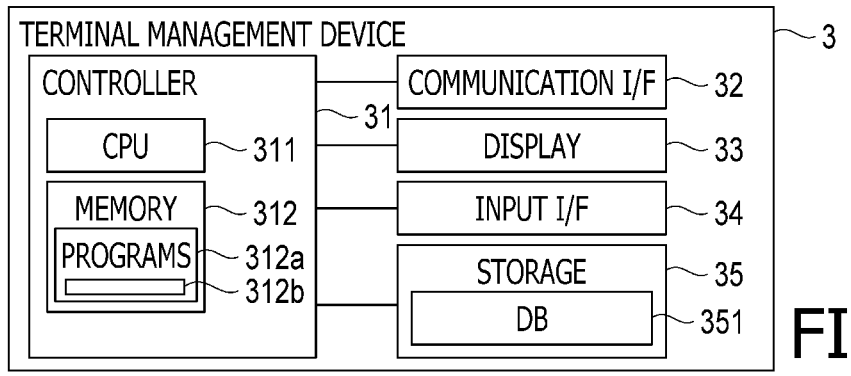
FIG. 2B is a block diagram schematically showing a configuration of a terminal management device included in the terminal management system in the illustrative embodiment according to one or more aspects of the present disclosure.

As shown in FIG. 2B, the terminal management device 3 includes a controller 31, a communication I/F 32, a display 33, an input I/F 34, and a storage 35. The controller 31 includes a CPU 31 and a memory 312. The CPU 311 performs various kinds of processing and control in accordance with software such as programs 312a stored in the memory 312, thereby realizing various functions of the terminal management device 3. However, the various functions of the terminal management device 3 are not limited to functions realized by the CPU 311 executing the software such as the programs 312a. Some or all of the various functions of the terminal management device 3 may be realized by one or more hardware elements.

The memory 312 includes one or more semiconductor memories (e.g., a ROM, a RAM, an NVRAM, and a flash memory) that are non-transitory substantive storage media. The memory 312 stores the software (e.g., the programs 312a) and data. The communication I/F 32 includes a network interface controller configured to connect with the WAN 6 and perform communication via the WAN 6. In the illustrative embodiment, the WAN 6 and the WAN 7 are the same network. Namely, the communication I/F 32 is configured to connect with the WAN 7 and perform communication via the WAN 7. The display 33 includes a display device (e.g., a liquid crystal display or an organic EL display), and is configured to display various images. The input I/F 34 includes an input device configured to receive various input operations, and an input controller configured to process inputs from the input device. The storage 35 includes one or more auxiliary storage devices such as an HDD and an SSD. The storage 35 contains a database 351 (hereinafter referred to as the "DB 351"). When the terminal management device 3 performs below-mentioned processes, various types of data are registered into the DB 351, updated, and deleted therefrom.

Figure 2C:
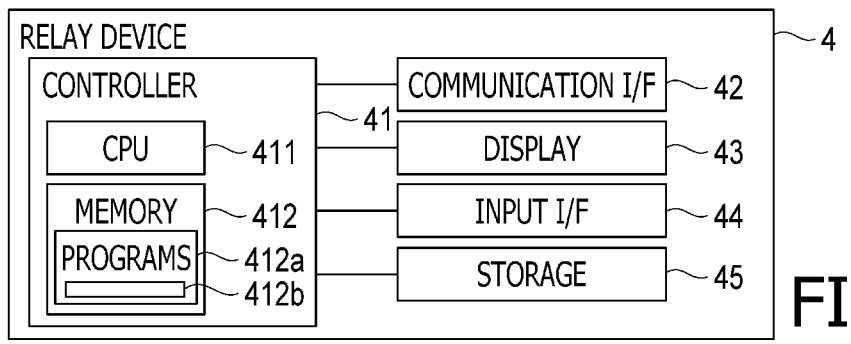
FIG. 2C is a block diagram schematically showing a configuration of a relay device included in the terminal management system in the illustrative embodiment according to one or more aspects of the present disclosure.

As shown in FIG. 2C, the relay device 4 includes a controller 41, a communication I/F 42, a display 43, an input I/F 44, and a storage 45. The controller 41 includes a CPU 411 and a memory 412. The CPU 411 performs various kinds of processing and control in accordance with software such as programs 412a stored in the memory 412, thereby realizing various functions of the relay device 4. However, the various functions of the relay device 4 are not limited to functions realized by the CPU 411 executing the software such as the programs 412a. Some or all of the various functions of the relay device 4 may be realized by one or more hardware elements.

The memory 412 includes one or more semiconductor memories (e.g., a ROM, a RAM, an NVRAM, and a flash memory) that are non-transitory substantive storage media. The memory 412 stores the software (e.g., the programs 412a) and data. The communication I/F 42 includes a network interface controller configured to connect with the WAN 7 and perform communication via the WAN 7, and a network interface controller configured to connect with the WAN 8 and perform communication via the WAN 8. The display 43 includes a display device (e.g., a liquid crystal display or an organic EL display) and is configured to display various images. The input I/F 44 includes an input device configured to receive various input operations, and an input controller configured to process inputs from the input device. The storage 45 includes one or more auxiliary storage devices such as an HDD and an SSD.

Figure 2D:
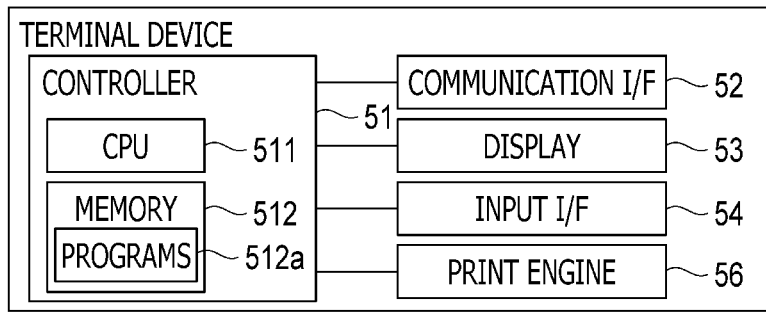
FIG. 2D is a block diagram schematically showing a configuration of a terminal device included in the terminal management system in the illustrative embodiment according to one or more aspects of the present disclosure.

As shown in FIG. 2D, each terminal device 5 includes a controller 51, a communication I/F 52, a display 53, an input I/F 54, and a print engine 56. The controller 51 includes a CPU 511 and a memory 512. The CPU 511 performs various kinds of processing and control in accordance with software such as programs 512a stored in the memory 512, thereby realizing various functions of each terminal device 5. However, the various functions of each terminal device 5 are not limited to functions realized by the CPU 511 executing the software such as the programs 512a. Some or all of the various functions of each terminal device 5 may be realized by one or more hardware elements.

The memory 512 includes one or more semiconductor memories (e.g., a ROM, a RAM, an NVRAM, and a flash memory) that are non-transitory substantive storage media. The memory 512 stores software (e.g., programs 512a) and data. The communication I/F 52 includes a network interface controller configured to connect with the LAN 8 and perform communication via the LAN 8. For instance, when one of the terminal devices 5 is a wireless LAN-compatible mobile printer, the communication I/F 52 thereof includes a network interface controller compliant with wireless LAN standards. Further, for instance, when one of the terminal devices 5 is a wired LAN-compatible printer, the communication I/F 52 thereof includes a network interface controller compliant with wired LAN standards.

The display 53 includes a display device (e.g., a liquid crystal display or an organic EL display) and is configured to display various images. The input I/F 54 includes an input device configured to receive various input operations and an input controller configured to process inputs from the input device. The print engine 56 includes a thermal printing mechanism, and is configured to perform printing on heat-sensitive roll paper. However, for instance, the print engine 56 may be configured to perform printing on cut paper. In another instance, the print engine 56 may be configured to perform printing in a known recording method (e.g., an inkjet method) other than the thermal method.

(2) Overview of Operations by Terminal Management System

In the illustrative embodiment, the terminal management system 1 operates as follows. In the following description, a computer functioning as the terminal management device 3 may be referred to as a "first computer 3." Further, a computer functioning as the relay device 4 may be referred to as a "second computer 4." When a terminal management processing program 312b is launched on the first computer 3, the first computer 3 starts processing necessary to function as the terminal management device 3. The terminal management processing program 312b includes a terminal management application (hereinafter referred to simply as a "management application") and user interface software (hereinafter referred to simply as "UI software"). The management application is software for achieving main functions of the terminal management device 3. The main functions may include a function of aggregating instructions from the centralized management device 2 and information on the terminal devices 5 and providing the information on the terminal devices 5 to the centralized management device 2, and a function of providing instructions from the centralized management device 1 to the terminal devices 5 via the relay device 4. The UI software is software mainly for providing a user interface of the terminal management device 3. In addition, the UI software has a below-mentioned installer generating function. It is noted that the terminal management processing program 312b may be included in the programs 312a stored in the memory 312 (see FIG. 2B).

When a relay processing program 412b is launched on the second computer 4, the second computer 4 starts processing necessary to function as the relay device 4. The relay processing program 412b includes relay software. The relay software is software for achieving main functions of the relay device 4. The relay processing program 412b is installed on the second computer 4 by using an installer generated by the terminal management device 3. The installer generated by the terminal management device 3 is, more specifically, generated by the aforementioned installer generating function of the UI software. It is noted that the relay processing program 412b may be included in the programs 412a stored in the memory 412 (see FIG. 2C).

At the time of starting the relay processing program 412b, the relay device 4 accesses the terminal management device 3 via the WAN 7 and sends a request for registration of the relay device 4 to the terminal management device 3. When receiving the request for registration of the relay device 4 from the relay device 4, the terminal management device 3 determines whether the relay device 4 has already been registered in the DB 351. When determining that the relay device 4 has not yet been registered in the DB 351, the terminal management device 3 registers information regarding the relay device 4 into the DB 351.

In addition, the terminal management device 3 registers, into the DB 351, action information representing that a periodic process should be performed as an action to be taken by the relay device 4. The action information is registered into the DB 351 as periodic information. The periodic information remains registered in the DB 351 without being deleted unless the periodic information is instructed to be deleted by a command transmitted from the centralized management device 2 to the terminal management device 3 or a command input by a user operation at the terminal management device 3. When the relay device 4 begins to operate, the relay device 4 performs the periodic process and periodically inquires of the terminal management device 3 whether there is an action to be taken by the relay device 4.

When action information regarding an action to be taken by the relay device 4 is registered in the DB 351, the terminal management device 3 transmits the action information to the relay device 4 as a reply to the inquiry. At the time of receiving an initial inquiry from the relay device 4, the terminal management device 3 transmits, to the relay device 4, the action information representing that the aforementioned periodic process should be performed by the relay device 4. The relay device 4 obtains the action information representing that the periodic process should be performed, and thereafter repeatedly performs the periodic process each time an interval elapses, according to a setting of the interval contained in the action information.

The relay device 4 searches for the terminal devices 5 to be managed, on the LAN 8, using SNMP ("SNMP" is an abbreviation for "Simple Network Management Protocol"). When the terminal devices 5 to be managed are found, the relay device 4 transmits a request for registration of the terminal information regarding the terminal devices 5 to the terminal management device 3. When receiving the request for registration of the terminal information, the terminal management device 3 registers the terminal information into the DB 351.

When a command transmitted from the centralized management device 2 to the terminal management device 3 or input by a user operation at the terminal management device 3 is a command to instruct a terminal device 5 to perform test printing or reboot, the terminal management device 3 registers action information corresponding to the command to the terminal device 5 into the DB 351. The action information is registered in the DB 351 as one-shot information. The one-shot information is information that is deleted from the DB 351 after a process corresponding to the one-shot information has been performed by the relay device 4 or a terminal device 5.

As described above, the relay device 4 periodically inquires of the terminal management device 3 whether there is an action to be taken by the relay device 4. When the aforementioned one-shot information is registered in the DB 351, the terminal management device 3 transmits the action information (i.e., the one-shot information) to the relay device 4 as a reply to the inquiry. The relay device 4 transmits a command to the terminal device 5 based on the action information received from the terminal management device 3. Thereby, the terminal device 5 performs a process such as test printing or rebooting. After execution of such a process by the terminal device 5, the relay device 4 transmits to the terminal management device 3 an execution result and an action deletion request that denotes completion of the action at the terminal device 5. The terminal management device 3 deletes the information corresponding to the action deletion request from the DB 351.

If the user wishes to change the interval of the periodic process to be periodically performed by the relay device 4, action information to provide an instruction to change the interval of the periodic process may be registered into the DB 351 by a command transmitted from the centralized management device 2 to the terminal management device 3 or by a command input by a user operation at the terminal management device 3. The action information is registered into the DB 351 as one-shot information.

As described above, the relay device 4 periodically inquires of the terminal management device 3 whether there is an action to be taken by the relay device 4. When the aforementioned one-shot information is registered in the DB 351, the terminal management device 3 may transmit the action information (i.e., the one-shot information) to the relay device 4 as a reply to the inquiry. The relay device 4 changes the interval of the periodic process that the relay device 4 is periodically performing, based on the action information received from the terminal management device 3. After having changed the interval, the relay device 4 transmits to the terminal management device 3 an execution result and an action deletion request that denotes completion of the action at the relay device 4. The terminal management device 3 deletes the information corresponding to the action deletion request from the DB 351. The relay device 4, which has received the action information to provide the instruction to change the interval, resumes the periodic process at the changed interval.

(3) Management Application Activating Process by Terminal Management Device

Next, an explanation will be provided of a management application activating process to be performed by the terminal management device 3. In the terminal management device 3, the CPU 311 performs processing according to the terminal management processing program 312*b* stored in the memory 312. The management application activating process described below is a process to be performed when the UI software included in the terminal management processing program 312*b* is launched. When the management application activating process is performed, the management application included in the terminal management processing program 312*b* is launched.

Figure 3:
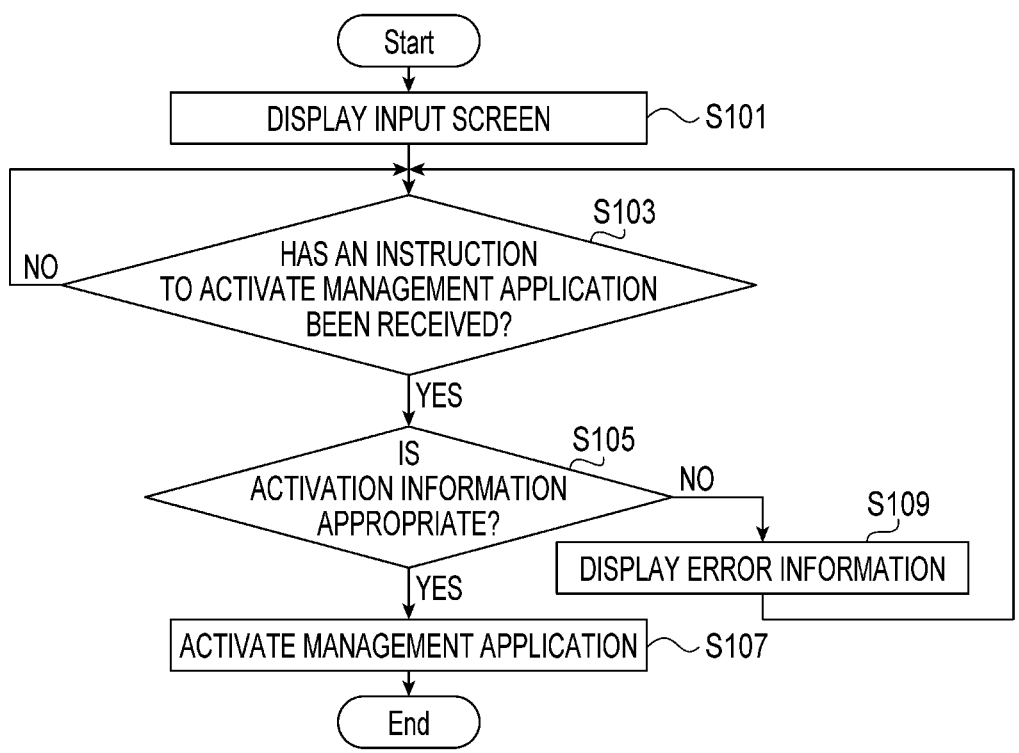
FIG. 3 is a flowchart showing a procedure of a management application activating process to be performed by the terminal management device, in the illustrative embodiment according to one or more aspects of the present disclosure.

When the management application activating process shown in FIG. 3 is started, the terminal management device 3 displays, on the display 33, an input screen 61 as shown in FIG. 4 (S101). As shown in FIG. 4, the input screen 61 includes a plurality of display elements arranged thereon such as a management application operational status display section 63, a START/STOP button 65, a port number display/entry field 67, an authentication information display field 69, an installer generating button 71, a client list display field 81, and a device list display field 83.

The management application operational status display section 63 is a field for displaying an operational status (e.g., "Working," "Not Working," and "Error Occurred") of the management application. The START/STOP button 65 is configured to switch to a STOP button for stopping the management application when the management application is working, and to switch to a START button for activating the management application when the management application is not working.

The port number display/entry field 67 is a field for displaying/inputting a port number of a communication port to be used by the management application when communicating with the relay device 4. The port number is set to be an appropriate port number by Web server software. Therefore, a user is usually not required to enter a setting value for the port number. When the setting value is not required to be input, the port number display/entry field 67 is put into a grayed-out state, in which this field 67 is a display-only field incapable of accepting a user input.

The authentication information display field 69 is a field for displaying a user ID and a password used for basic authentication to be performed when the terminal management device 3 communicates with the relay device 4. The installer generating button 71 is a button to be pressed by the user to generate the installer for the relay processing program 412*b* on the terminal management device 3.

The client list display field 81 is a field for displaying a list of the relay devices 4 existing in the terminal management system 1. The device list display field 83 is a field for displaying a list of the terminal devices 5 under the control of the relay device 4 selected in the client list display field 81. In the illustrative embodiment, the terminal management device 3 and the relay devices 4 are in the relationship of a server device and client devices. Therefore, the relay devices 4 are displayed in the client list display field 81. If "All" is selected in the client list display field 81, all of the terminal devices 5 under the control of all the relay devices 4 in the system 1 are displayed in the device list display field 83.

After completion of S101 (i.e., when the input screen 61 as shown in FIG. 4 is displayed), the terminal management device 3 determines whether an instruction to activate the management application has been received (S103). When the START/STOP button 65 has not been pressed (S103: No), the terminal management device 3 goes back to S103. Meanwhile, when the START/STOP button 65 is pressed while the management application is not working, the terminal management device 3 determines that an instruction to activate the management application has been received (S103: Yes). In this case, the terminal management device 3 then determines whether the activation information is appropriate (S105). For instance, the activation information may include a port number and authentication information for authenticating a client which attempts to access the terminal management device 3. Examples of the client may include, but are not limited to, the relay devices 4. The determination as to whether the activation information is appropriate is made based on whether the port number included in the activation information is within an appropriate range and/or whether the authentication information is included in the activation information.

When determining that the activation information is appropriate (S105: Yes), the terminal management device 3 activates the management application (S107). After completion of S107, the terminal management device 3 terminates the management application shown in FIG. 3. When determining that the activation information is not appropriate (i.e., the activation information is deficient) (S105: Yes), the terminal management device 3 displays error information on the display 33 (S109). After S109, the terminal management device 3 goes back to S103.

(4) Installer Generating Process by Terminal Management Device

Figure 5:
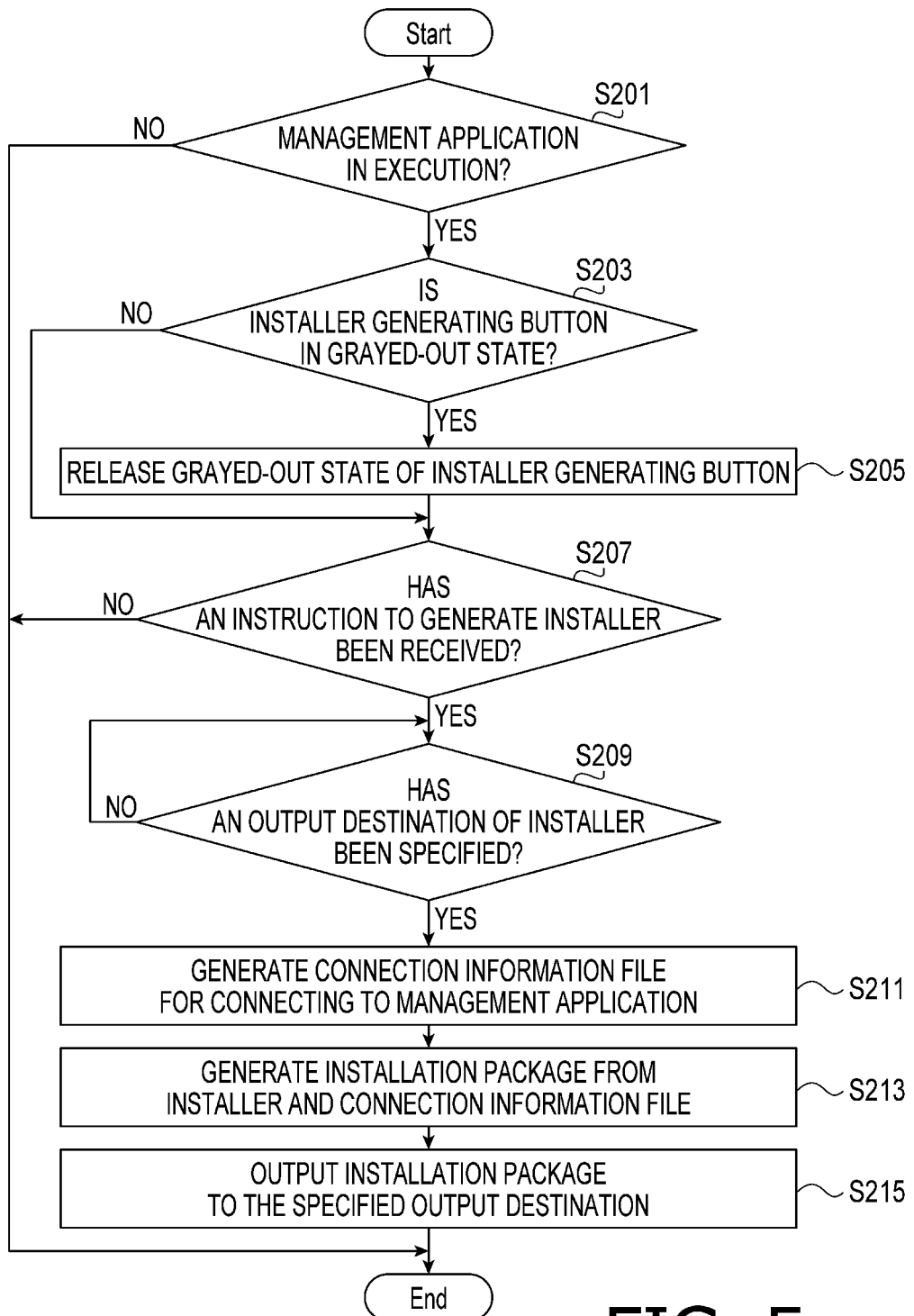
FIG. 5 is a flowchart showing a procedure of an installer generating process to be performed by the terminal management device, in the illustrative embodiment according to one or more aspects of the present disclosure.

Subsequently, an explanation will be provided of an installer generating process to be performed by the terminal management device 3. The installer generating process described below is a process to be performed when the UI software included in the terminal management processing program 312*b* is being executed. When the installer generating process shown in FIG. 5 is started, the terminal management device 3 determines whether the management application is in execution on the terminal management device 3 (S201). When determining that the management application is not in execution (S201: No), the terminal management device 3 terminates the installer generating process shown in FIG. 5.

When determining that the management application is in execution (S201: Yes), the terminal management device 3 determines whether the installer generating button 71 is in the grayed-out state (S203). When determining that the installer generating button 71 is in the grayed-out state (S203: Yes), the terminal management device 3 releases the grayed-out state of the installer generating button 71 (S205). After completion of S205, the terminal management device 3 goes to S207. Meanwhile, when determining that the installer generating button 71 is not in the grayed-out state (S203: No), the terminal management device 3 goes to S207 without executing S205.

The terminal management device 3 determines whether an instruction to generate the installer has been received (S207). When determining that an instruction to generate the installer has not been received (S207: No), the terminal management device 3 terminates the installer generating process shown in FIG. 5. Meanwhile, when determining that an instruction to generate the installer has been received (S207: Yes), the terminal management device 3 determines whether an output destination of the installer has been specified (S209).

In S209, the terminal management device 3 receives a user input operation. When determining that the output destination of the installer has not been specified (S209: No), the terminal management device 3 goes back to S209 and repeatedly executes S209. When the output destination of the installer is input by a user operation while S209 is repeatedly executed, the terminal management device 3 determines that the output destination of the installer has been specified (S209: Yes).

In this case, the terminal management device 3 generates a connection information file for connecting to the management application (S211). The connection information file generated in S211 includes at least an IP address of the terminal management device 3 and the port number used by the management application. Further, in the illustrative embodiment, an authentication process based on the basic authentication is performed when the terminal management device 3 and a relay device 4 communicate with each other. Therefore, the connection information file generated in S211 includes the user ID and the password required for the basic authentication.

Next, the terminal management device 3 generates an installation package from the installer and the connection information file (S213). The installer is used to install on the second computer 4 the relay processing program 412b for causing the second computer 4 to function as the relay device 4. The connection information file generated in S211 reflects information set in the actually-operating terminal management device 3. Specifically, in S213, a folder in which the installer and the connection information file are stored is generated as the installation package. Subsequently, the terminal management device 3 outputs the installation package to the specified output destination (S215). Specifically, in S215, the installation package (i.e., the folder in which the two files are stored) generated in S213 is output to a folder specified as the output destination. After completion of S215, the terminal management device 3 terminates the installer generating process shown in FIG. 5.

(5) Relay Software Installing Process by Relay Device

Figure 6:
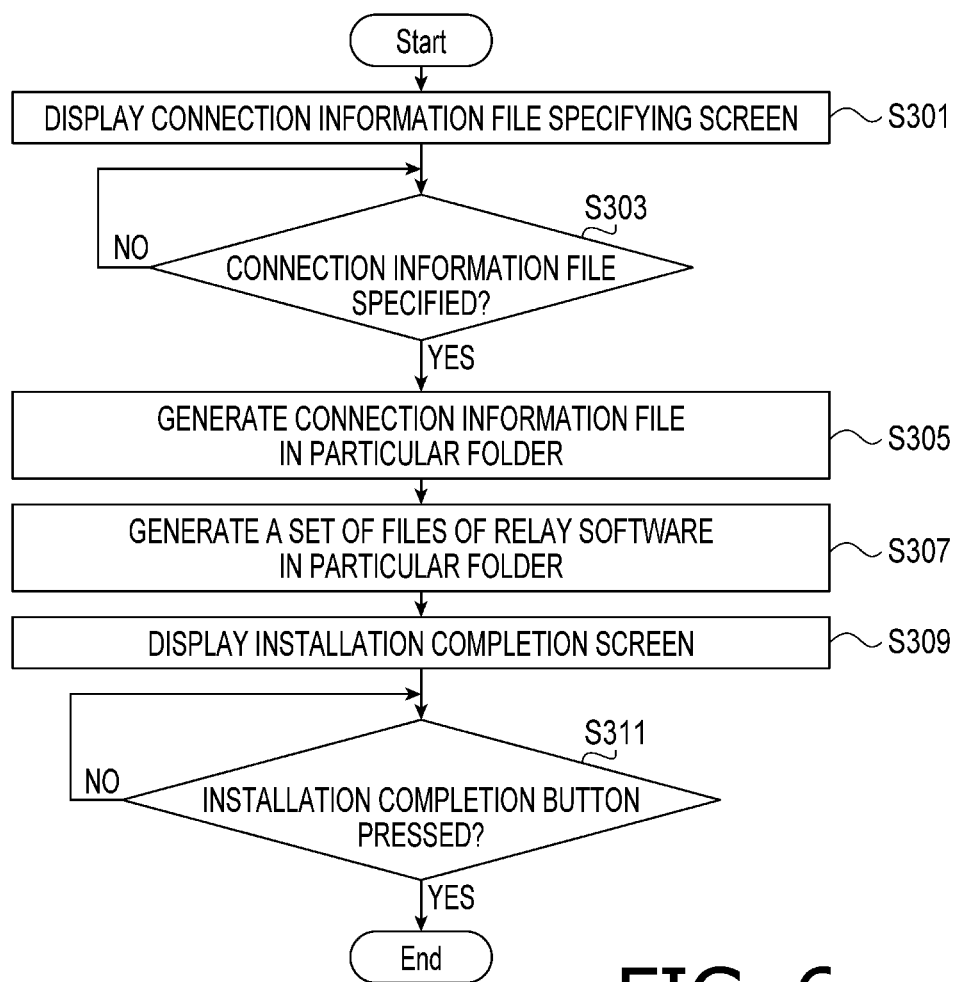
FIG. 6 is a flowchart showing a procedure of a relay software installing process to be performed by a second computer to function as the relay device, in the illustrative embodiment according to one or more aspects of the present disclosure.
Figure 7:
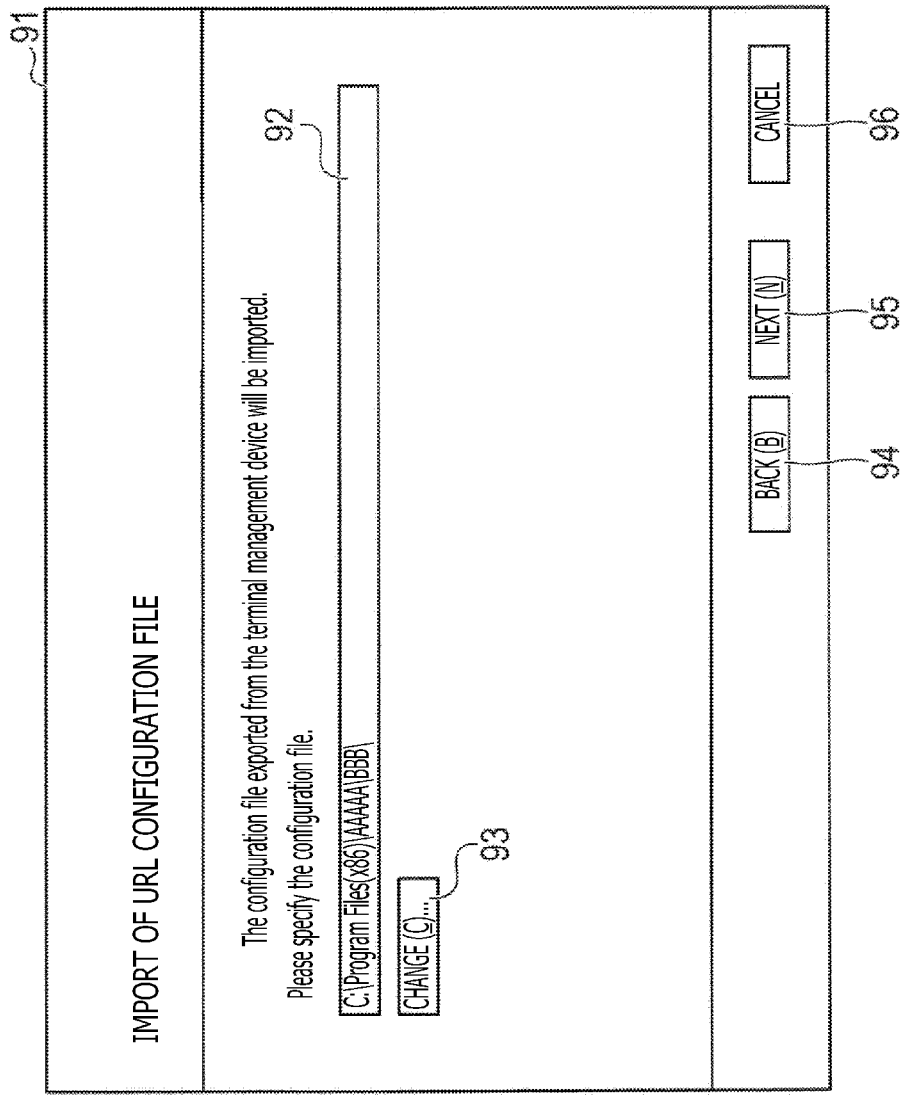
FIG. 7 shows an example of a connection information file specifying screen displayed on the second computer, in the illustrative embodiment according to one or more aspects of the present disclosure.

Next, an explanation will be provided of a relay software installing process to be performed by the second computer 4. The relay software installing process described below is a process to be performed when the installer in the installation package is launched on the second computer 4 using the installation package generated in the aforementioned installer generating process. When the relay software installing process shown in FIG. 6 is started, the second computer 4 displays a connection information file specifying screen 91 as shown in FIG. 7 (S301). The connection information file specifying screen 91 includes a plurality of display elements arranged thereon such as an input source folder display/entry field 92, a change button 93, a "BACK" button 94, a "NEXT" button 95, and a "CANCEL" button 96.

Subsequently, the second computer 4 determines whether the connection information file has been specified (S303). Specifically, in 303, when the "NEXT" button 95 is pressed on the connection information file specifying screen 91, and an appropriate connection information file is stored in a folder specified in the input source folder display/entry field 92, the second computer 4 determines that the connection information file has been specified (S303: Yes). In the illustrative embodiment, the connection information file includes authentication information for verifying whether the connection information file is appropriate. The installer checks whether the connection information file stored in the folder specified in the input source folder display/entry field 92 is an appropriate file by using the authentication information of the installer and the authentication information included in the connection information file.

When determining that the connection information file has not been specified (S303: No), the second computer 4 goes back to S303. Meanwhile, when determining that the connection information file has been specified (S303: Yes), the second computer 4 generates a connection information file in a particular folder (S305). Specifically, in S305, the connection information file in the installation package is duplicated to the particular folder to be referred to when the relay processing program 412b is executed. Subsequently, the second computer 4 generates a set of files of the relay software in the particular folder (S307). Specifically, in S307, program files and data files contained in the installer in the installation package are duplicated to the particular folder to be referred to when the relay processing program 412b is executed.

After completion of S307, the second computer 4 displays an installation completion screen (not shown) (S309). Subsequently, the second computer 4 determines whether an installation completion button on the installation completion screen has been pressed by the user (S311). When determining that the installation completion button has not been pressed (S311: No), the second computer 4 goes back to S311. When determining that the installation completion button has been pressed (S311: Yes), the second computer 4 terminates the relay software installing process.

(6) Modification of Relay Software Installing Process by Relay Device

Figure 8:
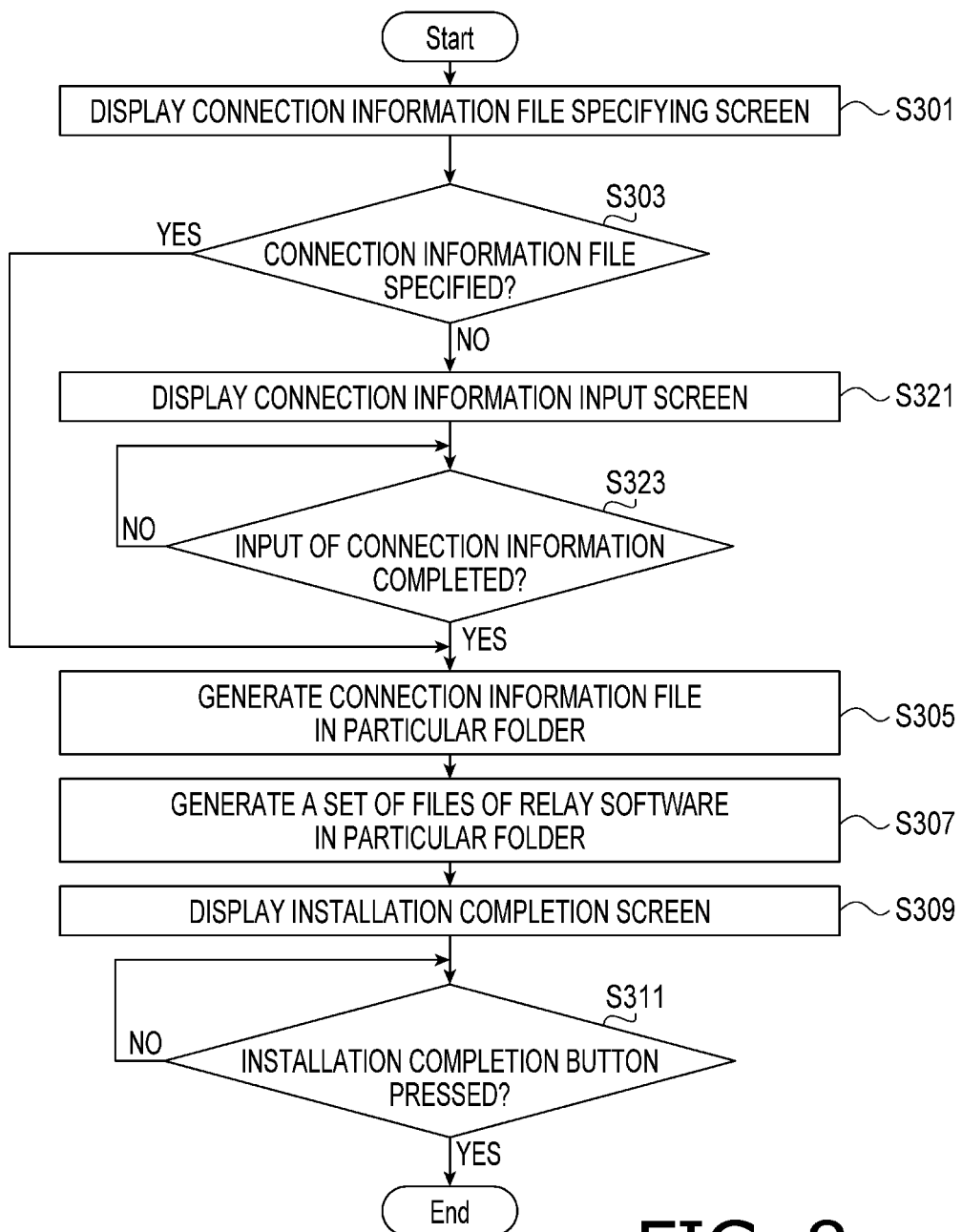
FIG. 8 is a flowchart showing a procedure of a relay software installing process to be performed by the second computer to function as the relay device, in a modification according to one or more aspects of the present disclosure.

Next, an explanation will be provided of a modification of the relay software installing process to be performed by the second computer 4. FIG. 8 is a flowchart showing a procedure of a relay software installing process in a modification according to aspects of the present disclosure. The relay software installing process shown in FIG. 8 differs from the relay software installing process shown in FIG. 6 in that the second computer 4 goes to S321 when determining that the connection information file has not been specified (S303: No). However, the relay software installing process shown in FIG. 8 includes substantially the same operations as in the relay software installing process shown in FIG. 6. Therefore, the following description focuses on the differences therebetween, whereas substantially the same operations will be provided with the same reference characters, and detailed explanations thereof will be omitted.

In the relay software installing process shown in FIG. 8, when determining that the connection information file has not been specified (S303: No), the second computer 4 displays a connection information input screen (not shown) (S321). In S321, instead of using the connection information file, the user is allowed to input connection information via the connection information input screen. Next, the second computer 4 determines whether the user operation of inputting the connection information has been completed (S323). Specifically, in S323, when an OK button is pressed on the connection information input screen displayed in S321, the second computer 4 determines that the user operation of inputting the connection information has been completed (S323).

When determining that the user operation of inputting the connection information has not been completed (S323: No), the second computer 4 goes back to S323. When determining that the user operation of inputting the connection information has been completed (S323: Yes), the second computer 4 goes to S305. In this modification, since the process of S321 to S323 is performed, even though the connection information file is unavailable for some reason (e.g., for such a reason as the connection information file is corrupted), it is possible to complete configuration of connection settings for the relay device 4 without using the connection information file.

(7) Advantageous Effects

As described above, when the installer generating process is performed by the terminal management device 3 (i.e., the first computer 3), it is possible to generate the installation package that contains the installer and the connection information file including information (e.g., the IP address of the terminal management device 3 and the port number used by the management application) collected by the first computer 3. When the relay processing program 412*b* is installed on the second computer 4 by using the installation package, communication settings for the second computer 4 are changed based on the connection information file included in the installation package, in such a manner that the terminal management device 3 and the relay device 4 are communicable with each other when the second computer 4 functions as the relay device 4. Therefore, an operator who installs the relay processing program 412*b* on the second computer 4 is allowed to complete configuration of the settings necessary for the relay device 4 to communicate with the terminal management device 3 even without knowing specific contents of the connection information file. Therefore, it is possible to start operation of the terminal management system 1 even without the operator having to perform any troublesome work for the communication settings.

Further, in the illustrative embodiment, when determining in S201 that the terminal management device 3 is in a state unable to collect terminal management device information (e.g., the IP address of the terminal management device 3 and the port number used by the management application), the terminal management device 3 terminates the installer generating process without executing S203 or S205. Thereby, the grayed-out state of the installer generating button 71 is not released, and the installation package is not generated. Therefore, it is possible to prevent a situation where the installation package is generated even though the first computer 3 is unable to collect the terminal management device information such as the IP addresses and the port number.

Further, in the illustrative embodiment, when the management application is not in execution, it is determined in S201 that the terminal management device 3 is in the state unable to collect the port number. Accordingly, the terminal management device 3 is not allowed to generate the installation package unless the terminal management device 3 is under an environment where the management application is actually functioning. Thus, it is possible to prevent obtainment of an unreliable port number and prevent generation of an installation package containing such unreliable connection information.

Further, in the illustrative embodiment, by the steps S209 to S211, it is possible to generate the installation package in the output destination arbitrarily specified by the user. Therefore, it is possible to generate the installation package in the output destination that is convenient for the user.

Further, in the illustrative embodiment, in S303, the installer checks whether the connection information file is an appropriate file by using the authentication information of the installer and the authentication information included in the connection information file. Therefore, it is possible to prevent a situation where the communication settings for the second computer 4 are changed even though connection information (e.g., the terminal management device information) in the connection information file is inappropriate information.

Further, in the illustrative embodiment, the terminal management device 3 is communicable with each relay device 4 via the firewall (e.g., the wireless LAN router 8A). Therefore, to establish the terminal management system 1, it is required to input information for communicating with the management application of the terminal management device 3 at each relay device 4. If such information is manually input by the user, it takes a considerable amount of time and effort of the user. Moreover, if an administrator of the terminal management device 3 collects such information and transmits the collected information to an administrator of each relay device 4, it also takes some amount of time and effort of the administrator of the terminal management device 3. In this respect, in the illustrative embodiment, as the installation package is generated in the aforementioned installer generating process, it is possible to complete configuration of the necessary communication settings by simply installing the relay processing program using the generated installer, even without the user knowing the IP address of the terminal management device 3 or the port number used by the management application.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

(8) Modifications

In the aforementioned illustrative embodiment, as described above, examples of the terminal devices 5 may include mobile printers, and printers and MFPs that are incompatible with the wireless LAN. However, the terminal devices 5 may not necessarily have a printing function. For instance, the terminal devices 5 may be PCs ("PC" is an abbreviation for "Personal Computer") or smartphones. In another instance, the terminal devices 5 may be industrial equipment or business equipment (e.g., industrial sewing machines, vending machines, business washing machines, medical equipment, etc.) configured to be remotely operated and managed via a network. In yet another instance, the terminal devices 5 may be household appliances (e.g., refrigerators, televisions, air conditioners, washing machines, etc.) configured to be remotely operated and managed via a network.

Further, in the aforementioned illustrative embodiment, the LAN 8 is configured with a combination of both the wired LAN and the wireless LAN. However, the LAN 8 may be configured with only one of the wired LAN and the wireless LAN.

Further, for instance, a plurality of functions achieved by a single element exemplified in the aforementioned illustrative embodiment may be realized by a plurality of elements. A single function achieved by a single element exemplified in the aforementioned illustrative embodiment may be realized by a plurality of elements. A plurality of functions achieved by a plurality of elements exemplified in the aforementioned illustrative embodiment may be realized by a single element. A single function achieved by a plurality of elements exemplified in the aforementioned illustrative embodiment may be realized by a single element. Some of the elements included in the configurations exemplified in the aforementioned illustrative embodiment may be omitted.

(9) Supplemental

As is apparent from the aforementioned illustrative embodiment, the UI software (hereinafter, which may be referred to as the "installation package generating program") and the installer according to aspects of the present disclosure may further be configured as follows.

The installation package generating program may be configured to, when executed by a processor of the first computer 3, cause the first computer 3 to perform a switching process. In the switching process, regarding an operable member (e.g., the installer generating button 71) to be operated by the user when the user instructs the first computer 3 to generate the installation package, the operable member may be made active when the first computer 3 is in a state capable of collecting the terminal management device information in a collecting process. Meanwhile, in the switching process, the operable member may be made inactive when the first computer 3 is in a state incapable of collecting the terminal management device information in the collecting process.

When the processor of the first computer 3 performs processing according to the installation package generating program configured as above in the state where the first computer 3 is capable of collecting the terminal management device information in the collecting process, the operable member is made active. Meanwhile, the operable member is made inactive when the first computer 3 is incapable of collecting the terminal management device information in the collecting process. Accordingly, when the user is allowed to operate the operable member, the installation package containing the terminal management device information collected by the first computer 3 is appropriately generated. On the other hand, when the user is not allowed to operate the operable member, the installation package is not generated. Therefore, it is possible to prevent a situation where the installation package is generated even though the first computer 3 is unable to collect the terminal management device information.

The installation package generating program may be configured to, when executed by the processor of the first computer 3, cause the first computer 3 to perform the switching process in which the operable member is made active when the first computer 3 is functioning as the terminal management device 3, whereas the operable member is made inactive when the first computer 3 is not functioning as the terminal management device 3.

When the processor of the first computer 3 performs processing according to the installation package generating program configured as above, the operable member is made active in the state where the first computer 3 is functioning as the terminal management device 3. Meanwhile, the operable member is made inactive in the state where the first computer 3 is not functioning as the terminal management device 3. Accordingly, it is possible to collect appropriate terminal management device information and generate the installation package under an environment where the first computer 3 is actually functioning as the terminal management device 3. Further, the installation package is not generated unless the first computer 3 is actually functioning as the terminal management device 3. Therefore, it is possible to prevent collection of unreliable terminal management device information and prevent generation of the installation package containing such unreliable terminal management device information.

The installation package generating program may be configured to, when executed by the processor of the first computer 3, cause the first computer 3 to perform a generating process to generate the installation package in an output destination arbitrarily specified by the user. When the processor of the first computer 3 performs processing according to the installation package generating program configured as above, the installation package is generated in the output destination that is convenient for the user.

The installation package generating program may be configured to, when executed by the processor of the first computer 3, cause the first computer 3 to generate the terminal management device information that includes at least an IP address assigned to the first computer 3 and a port number used by the first computer 3 when the first computer 3 functions as the terminal management device 3.

When the processor of the first computer 3 performs processing according to the installation package generating program configured as above, the terminal management device information includes the IP address and the port number as described above. Accordingly, the operator who installs the relay processing program 412*b* on the second computer 4 is allowed to complete configuration of the settings necessary for the relay device 4 to communicate with the terminal management device 3 even without knowing the IP address of the terminal management device 3 or the port number used by the terminal management device 3.

The terminal management device information may include authentication information. The installer may be configured to, when executed by a processor of the second computer 4, cause the second computer 4 to perform a determination process to determine whether the terminal management device information is appropriate information, based on the authentication information included in the terminal management device information. Further, the installer may be configured to, when executed by the processor of the second computer 4, cause the second computer 4 to perform a change process to, when the terminal management device information is determined to be appropriate information in the determination process, change communication settings for the second computer 4 based on the terminal management device information, thereby enabling the terminal management device 3 and the relay device 4 to communicate with each other when the second computer 4 functions as the relay device 4.

When the processor of the second computer 4 performs processing according to the installer configured as above, the communication settings for the second computer 4 are changed when the terminal management device information is appropriate information. Accordingly, it is possible to prevent a situation where the communication settings for the second computer 4 are changed even though the terminal management device information is not appropriate information.

The terminal management device 3 and the relay device 4 may be configured to communicate with each other via a firewall.

The following shows examples of associations between elements exemplified in the aforementioned illustrative embodiment and modifications and elements according to aspects of the present disclosure. The terminal management system 1 may be an example of "a system" according to aspects of the present disclosure. A relay device 4 included in the terminal management system 1 may be an example of "a relay device" according to aspects of the present disclosure. A terminal device 5 under the control of the relay device 4 may be an example of "a terminal device" according to aspects of the present disclosure. The terminal management device 3 may be an example of "a terminal management device" according to aspects of the present disclosure. The first computer 3 may be an example of "a first computer" according to aspects of the present disclosure. The second computer 4 may be an example of "a second computer" according to aspects of the present disclosure. The terminal management processing program 312b, which includes the management application and the UI software, may be an example of "computer-readable terminal management instructions" according to aspects of the present disclosure, and may also be an example of "a terminal management processing program" according to aspects of the present disclosure. The installer, generated by the terminal management device 3 in the installer generating process shown in FIG. 5, may be an example of "an installer" according to aspects of the present disclosure. The relay processing program 412b may be an example of "a relay processing program" according to aspects of the present disclosure. Examples of "terminal management device information" according to aspects of the present disclosure may include the IP address of the terminal management device 3 and the port number used by the management application, which are included in the connection information file generated by the terminal management device 3 in the installer generating process shown in FIG. 5. The installer generating button 71 may be an example of "an operable member" according to aspects of the present disclosure.

What is claimed is:

1. A non-transitory computer-readable medium storing computer-readable terminal management instructions configured to, when executed by a first processor of a first computer, cause the first computer to:
    function as a terminal management device configured to communicate with a terminal device via a relay device and obtain terminal information regarding the terminal device via the relay device;
    obtain terminal management device information regarding the terminal management device; and
    generate an installation package containing the obtained terminal management device information and an installer, the installer comprising computer-readable instructions configured to, when executed by a second processor of a second computer, cause the second computer to:
        install a relay processing program on the second computer, the relay processing program comprising computer-readable instructions configured to, when executed by the second processor, cause the second computer to function as the relay device; and
        change communication settings for the second computer based on the terminal management device information contained in the installation package, thereby enabling the second computer functioning as the relay device to communicate with the terminal management device.

2. The non-transitory computer-readable medium according to claim 1,
    wherein the terminal management instructions are further configured to, when executed, cause the first computer to:
        make an operable member active when the first computer is in a state capable of obtaining the terminal management device information, the operable member being configured to be operated by a user when the user instructs the first computer to generate the installation package; and
        make the operable member inactive when the first computer is not in the state capable of obtaining the terminal management device information.

3. The non-transitory computer-readable medium according to claim 2,
    wherein the terminal management instructions are further configured to, when executed, cause the first computer to:
        make the operable member active when the first computer is in a state where the first computer is functioning as the terminal management device; and
        make the operable member inactive when the first computer is not in the state where the first computer is functioning as the terminal management device.

4. The non-transitory computer-readable medium according to claim 1,
    wherein the terminal management instructions are further configured to, when executed, cause the first computer to generate the installation package in an output destination arbitrarily specified by a user.

5. The non-transitory computer-readable medium according to claim 1,
    wherein the terminal management device information includes:
        an IP address assigned to the first computer; and
        a port number used by the first computer when the first computer functions as the terminal management device.

6. The non-transitory computer-readable medium according to claim 1, wherein the terminal management device and the relay device are configured to communicate with each other via a firewall.

7. A non-transitory computer-readable medium storing an installer contained in an installation package generated by a first computer, the installer comprising computer-readable instructions configured to, when executed by a second processor of a second computer, cause the second computer to:
 install a relay processing program on the second computer, the relay processing program comprising computer-readable instructions configured to, when executed by the second processor, cause the second computer to function as a relay device; and
 change communication settings for the second computer based on terminal management device information contained in the installation package, thereby enabling the second computer functioning as the relay device to communicate with the first computer that is functioning as a terminal management device according to a terminal management processing program, the terminal management processing program comprising computer-readable instructions configured to, when executed by a first processor of the first computer, cause the first computer to:
  function as the terminal management device configured to communicate with a terminal device via the relay device and obtain terminal information regarding the terminal device via the relay device;
  obtain the terminal management device information regarding the terminal management device; and
  generate the installation package containing the obtained terminal management device information and the installer.

8. The non-transitory computer-readable medium according to claim 7,
 wherein the terminal management device information includes authentication information, and
 wherein the instructions of the installer are further configured to, when executed by the second processor, cause the second computer to:
  determine whether the terminal management device information is appropriate information, based on the authentication information included in the terminal management information; and
  when determining that the terminal management device information is appropriate information, change the communication settings for the second computer based on the terminal management device information in such a manner that the second computer functioning as the relay device is communicable with the terminal management device.

9. The non-transitory computer-readable medium according to claim 7,
 wherein the terminal management device and the relay device are configured to communicate with each other via a firewall.

10. A system comprising:
 a first computer;
 a second computer; and
 a terminal device,
 wherein the first computer comprises:
  a first processor; and
  a memory storing a terminal management processing program, the terminal management processing program comprising computer-readable instructions configured to, when executed by the first processor, cause the first computer to:
   function as a terminal management device configured to communicate with the terminal device via a relay device and obtain terminal information regarding the terminal device via the relay device;
   obtain terminal management device information regarding the terminal management device; and
   generate an installation package containing the obtained terminal management device information and an installer, and
 wherein the installer comprises computer-readable instructions configured to, when executed by a second processor of the second computer, cause the second computer to:
  install a relay processing program on the second computer, the relay processing program comprising computer-readable instructions configured to, when executed by the second processor, cause the second computer to function as the relay device; and
  change communication settings for the second computer based on the terminal management device information contained in the installation package, thereby enabling the second computer functioning as the relay device to communicate with the first computer functioning as the terminal management device.

* * * * *